Feb. 6, 1940.　　　　G. R. GOIN　　　2,189,204
VEHICLE RUNNING GEAR
Filed Oct. 19, 1936　　　2 Sheets-Sheet 1

Inventor
George R. Goin
By J. S. Murray
Attorney

Feb. 6, 1940.  G. R. GOIN  2,189,204
VEHICLE RUNNING GEAR
Filed Oct. 19, 1936   2 Sheets-Sheet 2

Inventor
George R. Goin
By J. S. Murray
Attorney

Patented Feb. 6, 1940

2,189,204

UNITED STATES PATENT OFFICE 2,189,204

VEHICLE RUNNING GEAR

George R. Goin, Detroit, Mich., assignor to Peninsular Metal Products Corporation, a corporation of Michigan Application October 19, 1936, Serial No. 106,397

4 Claims. (Cl. 280—124)

This invention relates to vehicle running gears and particularly trailer running gears.

An object of the invention is to adapt the mounting of a vehicle wheel to play vertically relative to a frame carried on such mounting, and to so install a leaf spring on the frame that it may largely absorb travel shocks and vibration without being subject to draft stresses, or attached to said mounting.

Another object is to journal a vehicle wheel on an arm pivoted on a frame for up-and-down play, to mount on the frame a spring opposing upward swinging of the arm, and to interpose a snubber between the frame and arm.

A further object is to suitably provide for transmitting load stresses to the wheel mounting, in event of failure of the spring.

These and various other objects are attained by the construction hereinafter described and illustrated in the accompanying drawings, wherein.

Figure 1:
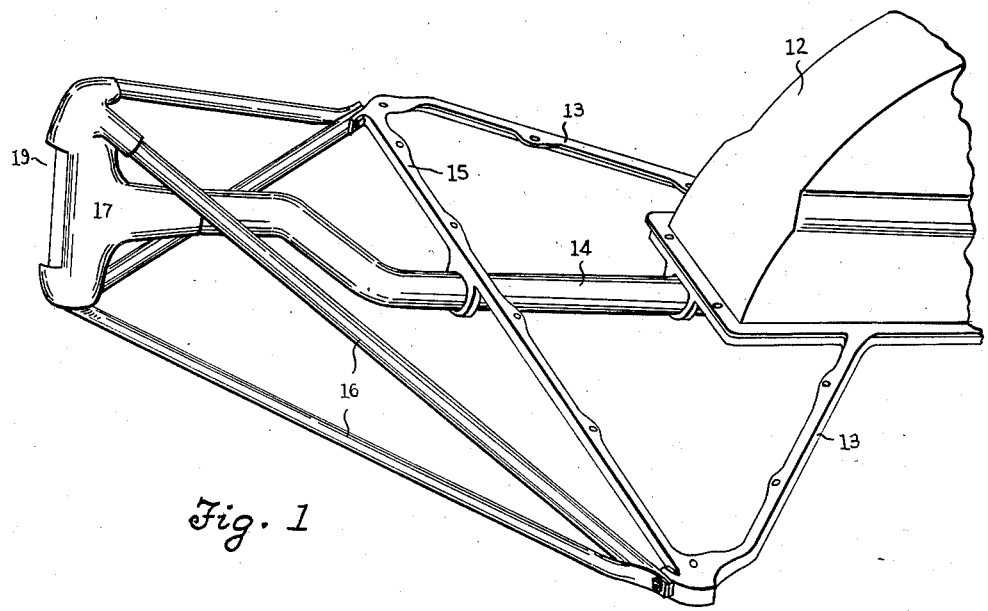
Fig. 1 is a perspective view of the vehicle frame, particularly showing the reinforced draw bar.
Figure 2:
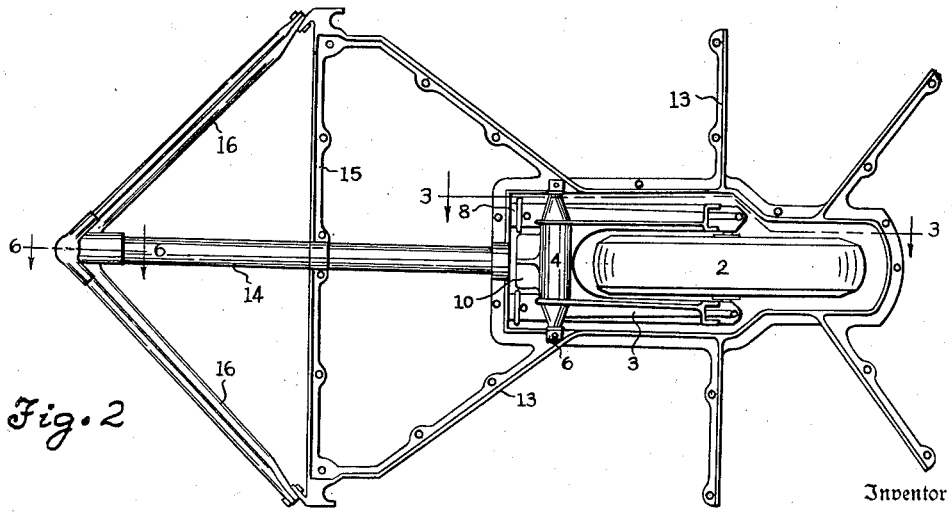
Fig. 2 is a bottom view of the same, showing also the running gear.
Figure 4:
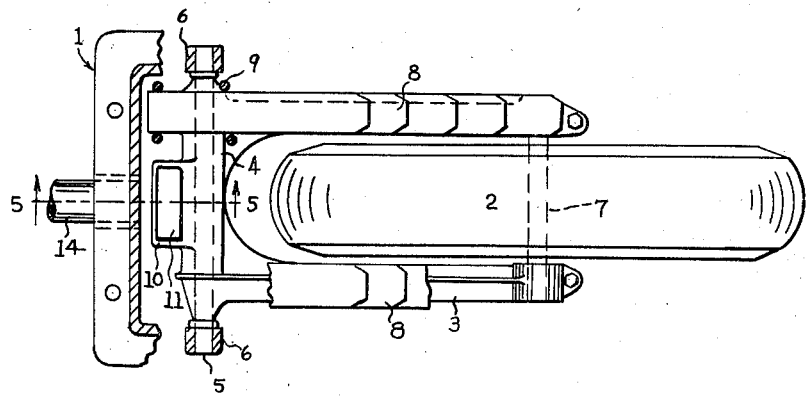
Fig. 4 is a horizontal sectional view, taken on the line 4—4 of Fig. 3, and particularly showing the running gear.
Figure 3:
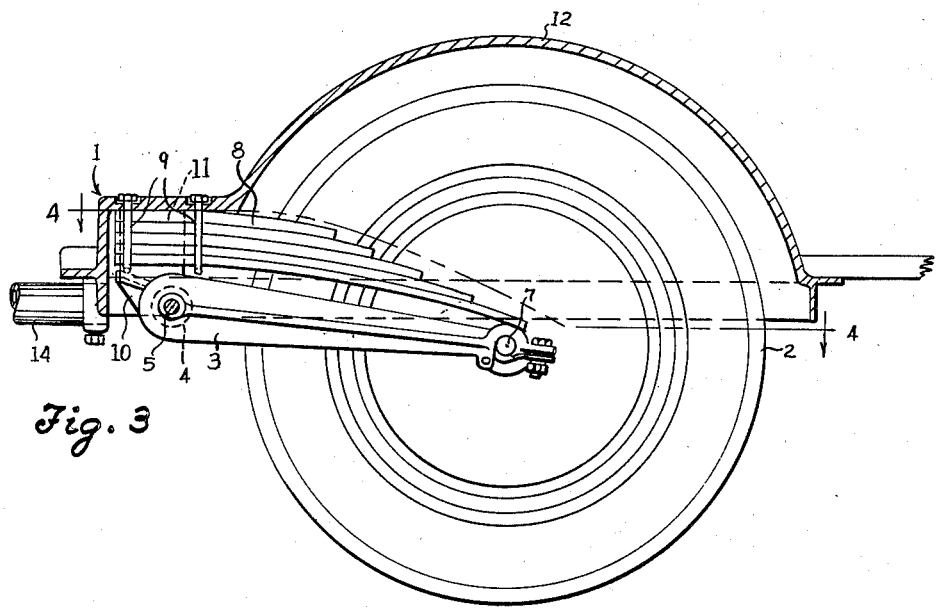
Fig. 3 is a longitudinal vertical sectional view, taken upon the line 3—3 of Fig. 2.
Figure 6:
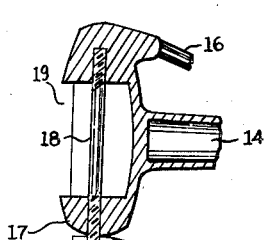
Fig. 6 is a fragmentary vertical sectional view of the king pin mounting, taken on the line 6—6 of Fig. 2.
Figure 5:
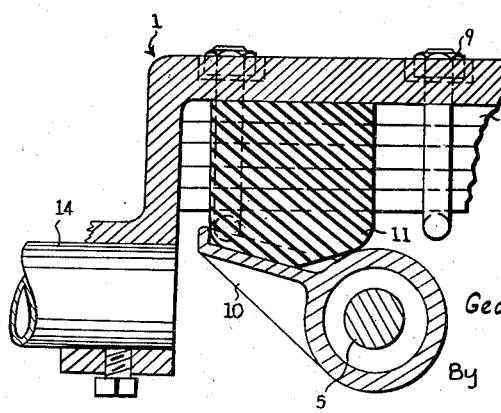
Fig. 5 is a fragmentary vertical section taken on the line 5—5 of Fig. 4.

In these views, the reference character 1 designates the frame of a one-wheeled trailer, the wheel 2 of which is journaled on the rear end of an arm 3, extending longitudinally of the vehicle and pivoted substantially at its forward end on the frame. Said arm is bifurcated, its furcations being integrally joined at the front end of the arm by a sleeve 4 pivoted on an arbor 5 terminally carried by a pair of lugs 6 integrally depending from the frame. The arm is restricted by said lugs from appreciable movement transverse to the vehicle, but may swing freely up and down on the arbor. The wheel is journaled between the furcations of the arm on a short axle 7 bridging the rear ends of said furcations and suitably clamped thereon.

Load stresses are transmitted from the frame to the wheel independently of the arm 3, other than its axle-engaging rear end. Thus above the furcations of the arm is disposed a pair of quarter elliptic leaf springs 8, their forward ends being rigidly clamped by U-bolts 9 to the bottom of the frame, and their relatively flexible rear ends resting freely on the corresponding ends of the furcations. Said springs are preferably normally downwardly bowed and progressively increased in flexibility as they extend rearwardly, their forward ends being spaced above the sleeve 4.

From the mid-portion of the sleeve 4, a lug 10 projects integrally forwardly and is recessed to seat and retain a rubber block 11 compressing the latter upwardly against the frame between the forward ends of the springs 8.

Preferably a portion 12 of the frame is upwardly domed to house the upper portion of the wheel, and it is further preferred to rigidly extend a plurality of spaced arms 13 laterally, forwardly, and rearwardly from the frame as supports for a trailer body (not shown).

A tubular draw bar 14 extends forwardly from the frame, in the central plane of rotation of the wheel and is reinforced in its mid-portion by a cross bar 15, joining the front ends of the two forward arms 13. From each end of said cross bar a pair of brace rods 16 extend forwardly divergently and one above the other to rigidly engage the top and bottom of a vertical sleeve 17 mounted fast on the front end of the draw bar 14. The sleeve 17 mounts a king pin 18, and has an opening 19 in its front face permitting any desired draft connection (not shown) to engage the king pin.

In operation of the described running gear, the springs 8 transmit load from the frame to the wheel without being subject to any draft stresses. The latter are taken care of by the arm 3, which plays freely up and down to conform with relative vertical movement of the frame and wheel incident to normal action of the springs.

The rubber block 11 exercises an important function in limiting movement incident to recovery of the springs 8 from any distortion and absorbing shocks and vibration incident to such movement. The described mounting of said block permits the same to function through a wide range of deflection of the springs 8.

Journaling of the wheel on the arm 3 positively avoids any lateral tilting of the wheel relative to the frame, while affording the wheel all necessary vertical play with respect to the frame.

Avoidance of any shackle connection between the wheel and arm reduces cost, simplifies installation and transmits load from the spring to the wheel without appreciable longitudinal thrust. No torsional strains are imposed on the leaf springs.

The extension of body-supporting arms laterally, forwardly and rearwardly from the domed central member, provides in a simple manner for securely attaching a body to the frame.

The rods 16 form a truss structure strongly reinforcing the draw bar.

The invention is presented as including all such modifications and changes as come within the scope of the following claims.

What I claim is:

1. A vehicle running gear including a frame, an arm pivoted on the frame about an axis transverse to the vehicle and extending rearwardly from such axis, a wheel journaled on the rear portion of such arm, with its axis transverse to the vehicle, a leaf spring rigidly mounted on the frame substantially above the forward portion of the arm and having its rear portion freely bearing downwardly on the rear portion of the arm, a resilient snubber reacting between the frame and said arm, and a lug seating such snubber and projecting forwardly from the pivoted end of the arm.

2. In a vehicle running gear, a frame, an arm pivoted on the frame to rock about an axis transverse to the frame, and comprising a pair of furcations spaced transversely of and extending lengthwise of the vehicle and a member rigidly connecting the furcations at the pivotal end of the arm, a wheel journaled on and between the furcations, with its axis parallel to and remote from the first-mentioned axis, a pair of leaf springs transmitting load to the furcations at points remote from the first-mentioned axis, means rigidly securing such springs to the frame in proximity to the first-mentioned axis, a projection rigidly carried by the mid-portion of said connecting member and extending oppositely to said furcations, and a snubber interposed between the frame and such projection.

3. A vehicle running gear comprising a frame, an arm pivoted on the frame about an axis transverse to the vehicle and extending rearwardly from such axis, a wheel journaled on the rear portion of the arm, with its axis transverse to the vehicle, a leaf spring rigidly mounted on the frame substantially above the forward portion of the arm and having its rear portion transmitting load to the arm remotely from the first-mentioned axis, an upwardly recessed lug projecting from the arm, forwardly of the first-mentioned axis, and a block of cushioning material carried by said lug in the recess thereof, and normally compressed between the frame and lug, said lug being materially shorter than the arm, whereby the block exercises its cushioning effect through a considerable deflection range of the spring.

4. A vehicle running gear comprising a frame, a bifurcated arm pivoted on the frame about an axis transverse to the frame, its furcations being spaced transversely of the vehicle and projecting lengthwise of the vehicle from said axis, a wheel journaled on and between the furcations, with its axis parallel to and remote from the first-mentioned axis, a pair of leaf springs transmitting a load to the furcations at points thereof remote from the first-mentioned axis, means for clamping said springs upon and beneath the frame, at points approximately above the pivotal axis of said arm, a lug rigidly projecting from the arm in a direction opposite to the furcations of the arm, and a snubber disposed between the springs and normally compressed upwardly by said lug against the frame.

GEORGE R. GOIN.